United States Patent [19]

Urlik et al.

[11] Patent Number: 5,174,516

[45] Date of Patent: Dec. 29, 1992

[54] MOTION PICTURE FILM SHIPPING AND HANDLING UNIT

[76] Inventors: Randall G. Urlik, 7990 S. Clayton St.; Peter T. Quinn, 7319 S. Lafayette Cir. West, both of Littleton, Colo. 80122

[21] Appl. No.: 641,298

[22] Filed: Jan. 15, 1991

Related U.S. Application Data

[63] Continuation-in-part of Ser. No. 584,793, Sep. 19, 1990.

[51] Int. Cl.$^5$ ............................................. B65D 85/671
[52] U.S. Cl. .................................. 242/55.18; 352/128; 206/404
[58] Field of Search .................. 242/55.18, 55.19 R, 242/55.19 A, 71.8, 77, 77.3, 77.4, 115, 116, 118.4, 118.6, 118.8; 352/126, 128; 206/398, 402, 404, 406, 408

[56] References Cited

U.S. PATENT DOCUMENTS

| | | | |
|---|---|---|---|
| 1,371,786 | 3/1921 | Martin et al. | 206/402 |
| 2,327,108 | 8/1943 | Heyer | 242/55.19 A |
| 2,475,036 | 7/1949 | Lopez-Henriquez | 242/55.18 |
| 3,340,997 | 9/1967 | McCreery et al. | 206/404 |
| 3,780,959 | 12/1973 | Burth | 242/55.18 |
| 3,823,890 | 7/1974 | Potts | 242/55.18 |
| 3,993,260 | 11/1976 | Bauer, Sr. | 242/55.18 |
| 4,010,910 | 3/1977 | Boudouris et al. | 242/55.18 |
| 4,169,566 | 10/1979 | Boudouris et al. | 242/55.18 |
| 4,240,593 | 12/1980 | Bell et al. | 242/71.8 |
| 4,676,370 | 6/1987 | Rudick | 206/404 X |

Primary Examiner—Daniel P. Stodola
Assistant Examiner—John P. Darling
Attorney, Agent, or Firm—Terry M. Gernstein

[57] ABSTRACT

A motion picture film shipping and handling unit is adaptable for use on either a platter-type movie projector system or on a reel-type movie projector system. The unit includes two film supporting flanges with a hub located therebetween. A central supporting hub is releasably connected to the hub, and fasteners releasably attach the elements together. A locking ring connects the flanges together and a flexible film winding ring surrounds the locking ring. A packing ring formed of one or more separate annular sections is located between the locking ring and the film winding ring. A handling assembly assists in moving a shipping and handling unit into position adjacent to a platter of a platter-type motion picture projector. Another form of the handling assembly includes a platter system that has the platters thereof mounted on pivots and telescoping arms to move into position to accept film from a vertically oriented film shipping and handling unit. Ramps elevate the shipping and handling unit as necessary.

15 Claims, 8 Drawing Sheets

MOTION PICTURE FILM SHIPPING AND HANDLING UNIT

TECHNICAL FIELD OF THE INVENTION

The present application is a continuation-in-part of patent application U.S. Ser. No. 07/584,793, filed on Sep. 19, 1990.

The present invention relates to the general art of winding and reeling, and to the particular field of motion picture film handling systems.

BACKGROUND OF THE INVENTION

Modern movie films are generally manufactured in one location and shipped to various distributors located throughout the world. These distributors then move the films to various theaters with whom they are associated. This distribution system has been in place for many years, and has worked well.

However, recent changes in movie film formats as well as theater format have placed a strain on this system. For example, modern films can be in a variety of formats and can be any length including 12,000 feet or longer. Such movie films can weigh 40 or more pounds, and can be easily damaged by improper handling. Heretofore, many producers have shipped a film in multiple segments that are spliced together after receipt to form a single film. Prior to returning, the film must be broken down to its original form. Splicing associated with this shipping method has damaged films, shortened films, deleted frames, and the like.

Still further, many modern theaters are complexes of a plurality of individual movie theaters. Several movies may be run in these complexes, and one feature film also may be shown in several theaters of one complex. This can create several problems. For example, moving a heavy film from one place to another may subject that film and its supporting elements to physical abuse or damage. The film supporting system also can be damaged in this process. Such damage may delay the showing of the film to permit repairing the film or to permit repairing or replacing the handling system. Sometimes, damage to, or loss of, one element of the handling system requires replacing the entire handling system. This can cause extra expense and aggravation for an exhibitor.

Still further, most theaters use a platter-type projection system while other theaters, perhaps in the same complex, use a reel-type projection system. Sometimes, a single theater may use a combination of both a platter-type system and a reel-type system. A platter-type projection system generally involves a horizontal orientation for a film and connection of the film supporting element to a "brain" that controls film movement. On the other hand, a reel-type projection system generally involves attaching a film supporting reel to a projector spindle that is vertically or horizontally oriented. The different projection systems may require a film recipient to assemble films on different handling systems before these films can be shown. If the distributor assembles the films, he must know which system a theater uses before sending a film to that theater. Film assembly at a theater may subject the film to damage due to errors in the assembly process and splicing.

Also, one theater may include both a platter-type projection system and a reel-type projection system. For various reasons, the theater may want to display the film using one system one time, and the other system another time. Presently, if the film is on a handling system designed for a platter-type system, it must be moved to a handling system designed for a reel-type projection system to change display systems, and vice versa. This can be an onerous and expensive task. If, for example, a theater has both types of projection systems, and one system is used as a backup for the other system, that theater may be required to have two shipping and handling systems to effect the change from one system to the other in a reasonable time. This is especially necessary if there is a interruption in display of the film. If the distributor must assemble the film on different shipping and handling systems, the costs of the distribution system may be increased, while the efficiency thereof may be decreased.

Of course, a shipping and handling system must be manufacturable and usable in an efficient and cost-effective manner if it is to be commercially successful. Thus, while a system should be versatile, easy to use and protect the film and its supporting elements, it must still be cost and use efficient.

Therefore, there is a need for a motion picture shipping and handling system that is amenable for use with films of all lengths, including full length feature films, and that can be used with either a platter-type system or a reel-type projection system, yet which is inexpensive to manufacture and use, and which also protects the film and the film handling system from damage.

The motion picture film shipping and handling system and method disclosed in the parent application, the disclosure of which is fully incorporated herein by reference, solved the above-noted problems in an effective manner. However, the inventors have noted that most theaters attach approximately 1000 feet of film to the beginning of a movie to advertise concessions and new movies to be shown in the future. During the last showing of a film, the film is wound onto a platter so the trailer is on the inside. The trailer must be removed before the film can be shipped to the next theater or to a film exchange.

Film wound onto a film winding ring, such as disclosed in the parent application, will not change its inner diameter if the ring is removed. If a portion of the film, such as the trailer, is removed, the film inner diameter will increase to a new diameter. This new diameter can be variable from one theater to another because the trailers used at each theater can have different lengths.

Therefore, while effective, the motion picture film handling means disclosed in the parent application can be further improved by adapting it to efficiently accommodate such varying film inner diameters.

Still further, since many motion picture films can be quite heavy and cumbersome, handling such films, such as to simply move the film from a shipping container to a platter of a platter-type projection system, can be difficult. Often, such procedures can require two people. Due to the cumbersome nature of these motion picture films, it is also difficult to move them onto work tables to look at ques, insert trailers or the like, or to move the film onto a rewind/make-up table.

Therefore, there is a need for a means to assist in moving a motion picture film onto a platter of a platter-type movie projection system, or to facilitate various operations on the film, such as rewind, make-up, insertion of trailers or the like.

OBJECTS OF THE INVENTION

It is a main object of the present invention to improve the motion picture film shipping and handling system disclosed in the parent patent application.

It is another object of the present invention to improve the motion picture film shipping and handling system disclosed in the parent patent application by making such system amendable to accommodating films of various inner diameters.

It is another object of the present invention to improve the motion picture film shipping and handling system disclosed in the parent patent application by making such system amendable to accommodating films having different trailer lengths.

It is another object of the present invention to improve the motion picture film shipping and handling system disclosed in the parent patent application by easing the movement of a motion picture film onto a platter of a platter-type projection system.

It is another object of the present invention to improve the motion picture film shipping and handling system disclosed in the parent patent application by facilitating operations such as film rewind, make-up, addition of trailers, and shuttle to a platter.

SUMMARY OF THE INVENTION

These, and other objects, are achieved by a motion picture film shipping and handling system that includes a film-supporting and handling unit that is easily adaptable to accommodate films of various inner diameters and a handling assembly that is used to assist in moving the film-supporting unit from a vertical orientation with one edge resting on a support surface, such as a floor, into an elevated horizontal position.

Specifically, the film-supporting and handling unit includes a means for varying the spacing between a locking ring used to attach two annular flanges together, and a film winding ring, used to support the film. The spacing varying means includes a packing ring that is formed of one or more separate sections of flexible, crushable, packing-type plastic material. The packing ring material is inserted between the film winding ring and the locking ring and can be formed of several sections, each having a thickness that can be different from adjacent sections whereby the spacing can be varied as required to provide a snug fit between the locking ring and the film winding ring for all film lengths. One of the packing ring sections, preferably the thinnest section, can be cut into various lengths to fill in any spaces to further ensure a snug fit.

The means further includes a stand assembly that is used to elevate a shipping and handling unit and to change the orientation of such unit from vertical to horizontal. The stand is used to lift a handling unit into a position and orientation that permits easy transfer of the film onto a platter of a platter-type projection system onto a rewind/make-up table for film breakdown, or directly to a projector. The stand assembly can serve as a work table for looking up ques, inserting trilers, or the like whereby more than one person is not needed to lift the film onto such worktable. The stand assembly further facilitates shuttling the film directly to a platter or to film rewind, or directly to the projection system via a platter roller, without requiring several people to manipulate the film.

Specifically, the stand assembly includes a ramp onto which a film handling unit can be rolled and a spindle that engages a spindle accommodating means on the film handling unit. The spindle on the stand is pivotally mounted on the stand to move from a horizontal orientation into a vertical orientation. Once engaged onto the spindle, the film handling unit can be moved from a vertical orientation to a horizontal orientation by simply manipulating that unit on the spindle which supports the weight of that unit.

In this manner, the film shipping and handling system embodying the present invention is very efficient to manufacture, to use and to replace, yet is secure and strong and is amendable to accommodating films of varying size so different trailers can be used.

DETAILED DESCRIPTION OF THE PREFERRED EMBODIMENT OF THE INVENTION

Figure 1:
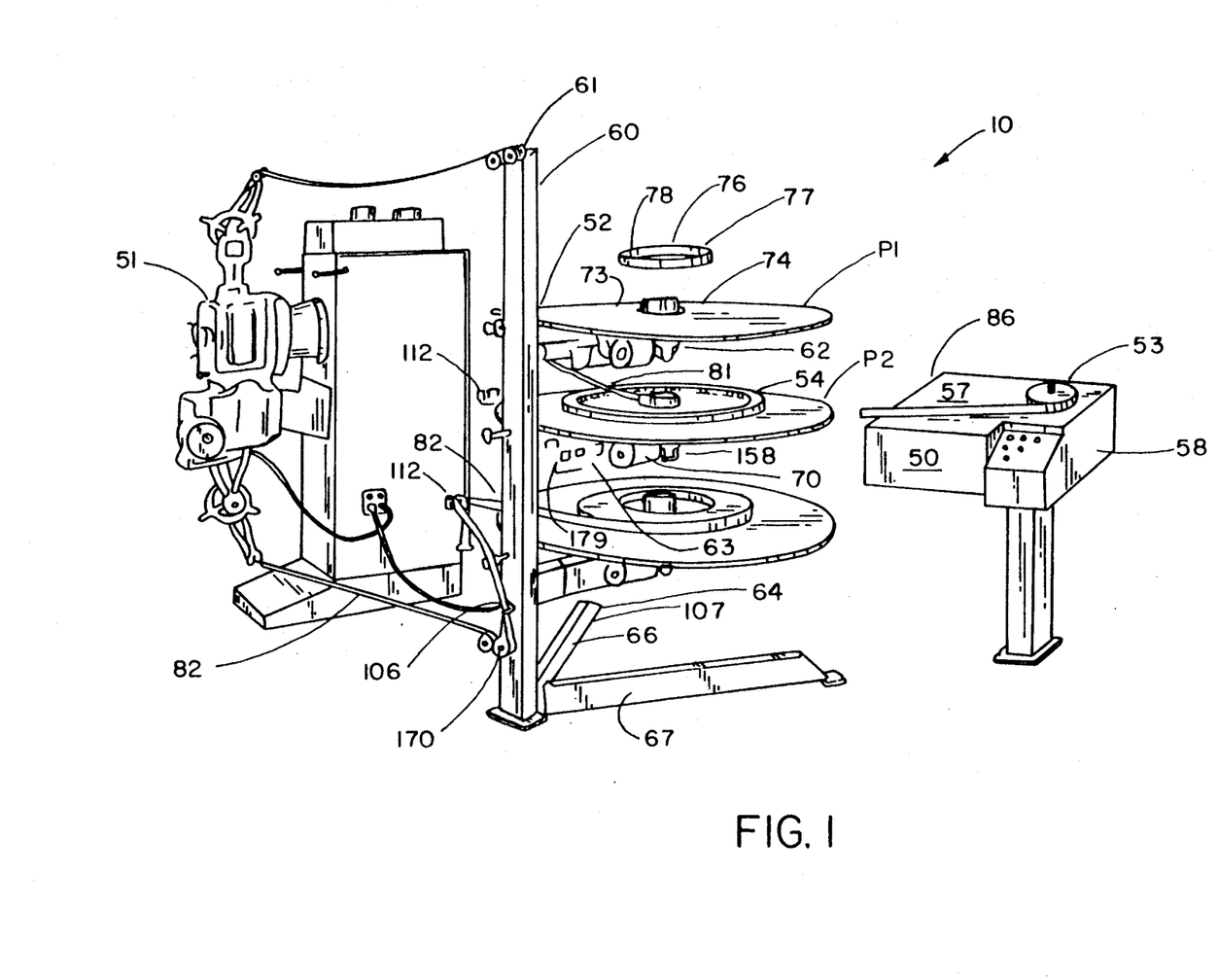
FIG. 1 is a perspective view of a platter-type movie projector system.
Figure 2:
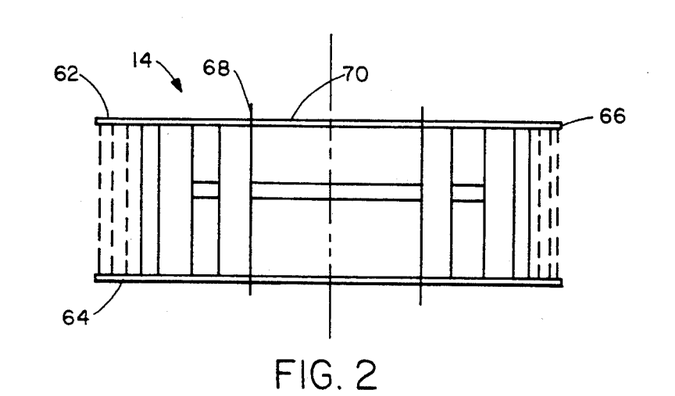
FIG. 2 is a general side elevational view illustrating a film shipping and handling unit of the present invention.

Shown in FIG. 1 is a platter-type projector system 10 (as disclosed in U.S. Pat. No. 3,823,890) the disclosure of which is incorporated herein by reference. In the case of the platter-type system, film is fed onto and off of horizontally oriented platters, such as platters P1, P2 and P3. The precise functioning and operation of this type of movie projector system is known to those skilled in the movie projection art, and is discussed in the incorporated patent, and thus will not be discussed in detail.

The motion picture film shipping and handling system of the present invention permits a single film handling system to accommodate films of various lengths, such as films having trailers of different lengths, as well as assists in elevating and re-orienting such handling units into a position for easy transfer of a film onto a platter of a platter-type projection system. The shipping and handling unit 14 of the present invention is broadly shown in FIGS. 3 and 4. Broadly, the unit 14 includes two identical annular flanges 62 and 64 which are formed of aluminum or the like. Each of the flanges includes an outer edge 66 having an outer diameter and an inner edge 68 defining a central opening 70 which has a diameter. The central openings 70 of the flanges are sized to accommodate a "brain" of a platter system so film supported on the flanges can be moved by the platter system.

Figure 3:
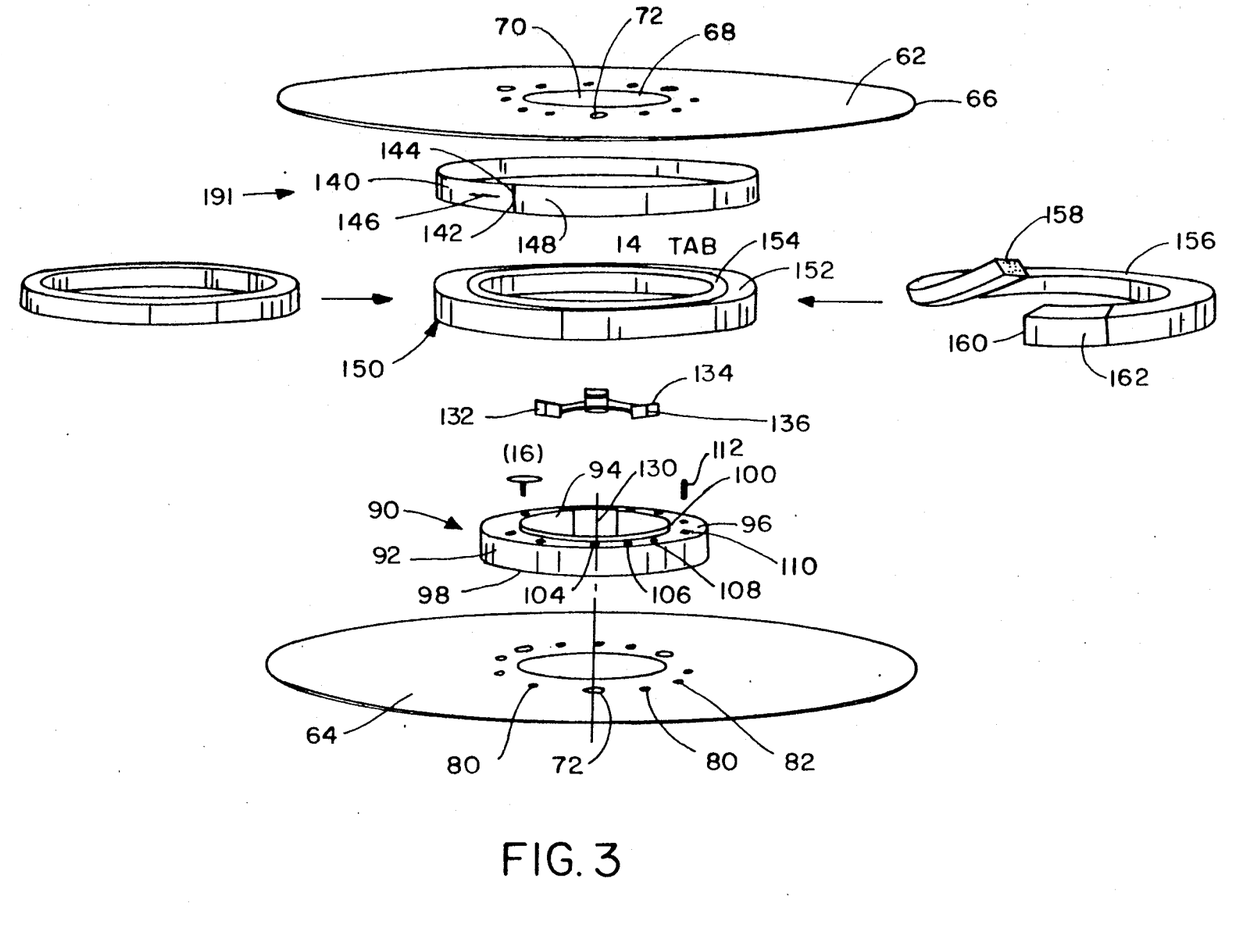
FIG. 3 is an exploded perspective view of the film shipping and handling unit embodying the present invention.
Figure 4:
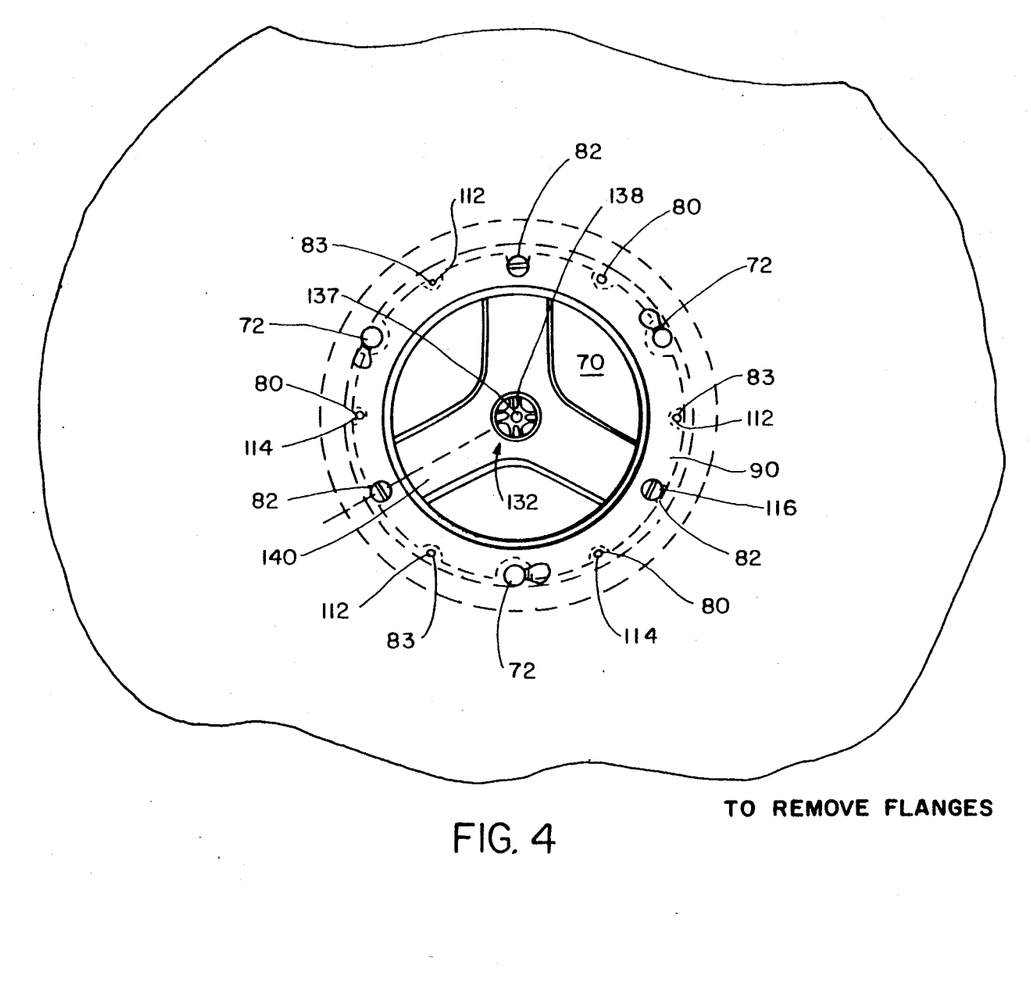
FIG. 4 is a top plan view of the shipping and handling unit of the present invention.

Each flange also includes a plurality of fastener-receiving holes 72 placed at sixty degree spacings circumjacent to the central hole 70. The holes are fully discussed in the parent application and receive Norway bolts. Each flange also includes further fastener accommodating holes 80 which extend through the flange to receive a fastener for attaching the flange to a shipping container. Further fastener-receiving holes 82 for receiving fasteners 84 for a purpose that will be discussed below. Further fastener-receiving holes 83 are also included and will be discussed below.

The film shipping and handling unit further includes a locking ring 90 releasably attached to both of the flanges as will be discussed below, and holds these flanges together with the film therebetween. The locking ring is annular with an outer wall 92 having a diameter larger than the diameter of central opening 70, and an inner wall 94 having an outer diameter essentially equal to, but slightly less than, the diameter of opening 70 whereby the inner wall will snugly engage the flanges adjacent to the central openings. The locking ring also includes a top surface 96 and a bottom surface 98 connected together by the inner and outer walls. The inner wall 94 extends above the top and bottom surfaces to form top and bottom flanges, such as top flange 100, which abut the annular flanges adjacent to the central openings thereof.

The locking ring includes fastener receiving openings that correspond to the fastener receiving openings defined through the flanges. Therefore, the locking ring includes fastener-receiving openings 104 that correspond to flange openings 72 through which the Norway bolts fit; fastener-receiving openings 106, that correspond to flange openings 80; fastener-receiving openings 108 that correspond to flange openings 82; and fastener-receiving opening 110 that corresponds to opening 83 in the flanges. Locking screws 112 are received through openings 110 and 83 to prevent rotation of the flanges. Special locking screws 114 are received through holes 80 and 106 to attach the unit to a shipping container, such as the case disclosed in the parent application. Flange screws 116 are accommodated in holes 82 and 108 so the flanges can be permanently attached to the locking ring if desired.

Figure 5:
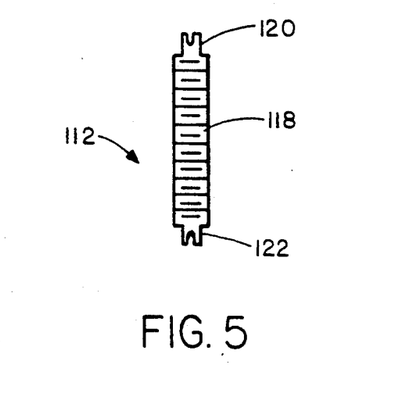
FIG. 5 is a side elevational view of a locking fastener used to attach a locking ring to a platter of a platter-type projection system via a flange of the shipping and handling unit.
Figure 6:
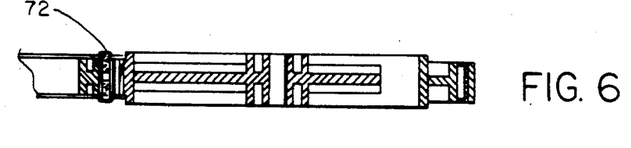
FIG. 6 is a side elevational view of one section of the film shipping and handling unit.
Figure 7:
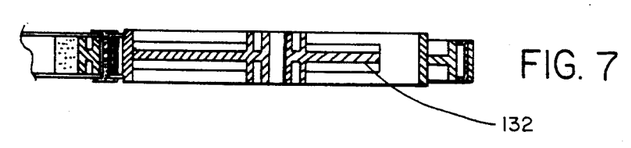
FIG. 7 is a side elevational view of another section of the film shipping and handling unit.
Figure 8:
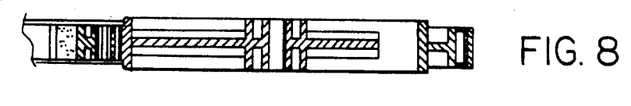
FIG. 8 is a side elevational view of another section of the film shipping and handling unit.
Figure 9:
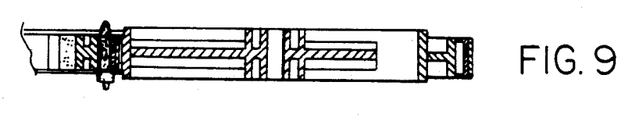
FIG. 9 is a side elevational view of another section of the film shipping and handling unit.

As shown in FIG. 5, screw 112 has an externally threaded body 118 and two driving member connecting elements 120 and 122 on each end of that body. The screws 112 can be extended into an opening in a platter to orient a flange to that platter.

The inner wall 94 of the locking ring includes a plurality of keyways 130 spaced apart from each other by approximately 120°.

The unit also includes a center hub 132 that is similar to the center hub discussed in the parent application. The center hub 132 differs from the aforediscussed center hub by including a plurality of feet 134, each having a key 136 thereon. The keys 136 are received in the keyways 130 of the locking ring to affix the center hub to the locking ring. As shown in FIG. 4, the center hub 132 includes a spindle engaging section having an axle engaging hole 137 defined centrally thereof and a plurality of pin engaging holes 138 spaced therearound. The central hub also includes a plurality of legs 140.

The center hub is fixed to the locking ring by the keys mating in the keyways and can be removed from the center hub after the flanges have been removed.

The unit also includes a film winding ring 141. The film winding ring is formed of flexible metal that tends to straighten out and has ends 142 and 144, with an elongated slot 146 defined therein adjacent to end 142 and tab 148 mounted thereon adjacent to end 144. The tab is received in the slot to attach ends 142 and 144. The material memory of the film winding ring tends to force that winding ring to assume its maximum diameter; however as will be discussed below, wrapping film therearound opposes this bias to force the winding ring to assume a desired size.

The film winding ring has an inside diameter that is greater than the outer diameter of the locking ring. Therefore, when the unit is assembled, the film winding ring surrounds the locking ring and is spaced radially outward from that locking ring.

The spacing between the film winding ring and the locking ring is filled with a packing ring 150. The packing ring is formed of flexible, closed cell plastic material that can be compressed as necessary, yet is rigid enough to maintain the winding ring spaced apart from the locking ring for the purposes of storing film in the unit. The packing ring resiliently supports the film winding ring from inside that film winding ring.

The packing ring includes a plurality of separate annular sections, such as sections 152 and 154. Each section has an inside diameter and an outside diameter, with the inner diameter of section 152 being essentially equal to, but slightly larger than, the outside diameter of the section 154 whereby the section 154 will fit snugly into the section 152. Each section has a thickness dimension measured between the inside diameter and the outside diameter thereof. The sections of the packing ring can have different thicknesses whereby different spacings between the locking ring and the film winding ring can be accommodated. The packing ring further includes a section 156 that has ends 158 an 160 and a thickness that is less than the thicknesses of sections 152 and 154. This section 156 is cut into portions, such as portion 162, and these portions can be jammed between the sections 152 and 154, or between those sections and the winding ring or the locking ring to ensure a snug fit between the locking and film winding rings. The portions 162 can be strategically placed at various locations about the packing ring as necessary to ensure this snug fit. The preferred form of the packing ring includes a polyethylene foam material that is not a structural foam but is resilient enough to be forced into the spacing between the locking ring and the film winding ring.

The various sections of the unit are shown in FIGS. 6-9. The unit is used by placing one of the annular flanges on a platter selected for take-up of a final showing. The locking ring is attached to that flange, and the size of the film winding ring is set by attaching the tab 148 to the slot 146 and placing that film winding ring around the locking ring. The smallest packing ring is placed between the film winding ring and the locking ring. The film winding ring has a slot therein that receives the end of the film strip, and film is then wound onto the film winding ring during the last showing of the film.

The smallest section of the packing ring is removed if the trailer is to be removed. The trailer is then removed. The film winding ring is then unlocked or otherwise permitted to expand against the surrounding film. A new packing ring is inserted between the locking ring and the film winding ring to snugly and resiliently secure the film winding ring, at its new size, to the locking ring. The other flange is then placed on top of the film, and locked to the first-mentioned flange in a manner discussed in the parent application using the Norway bolts.

Figure 10:
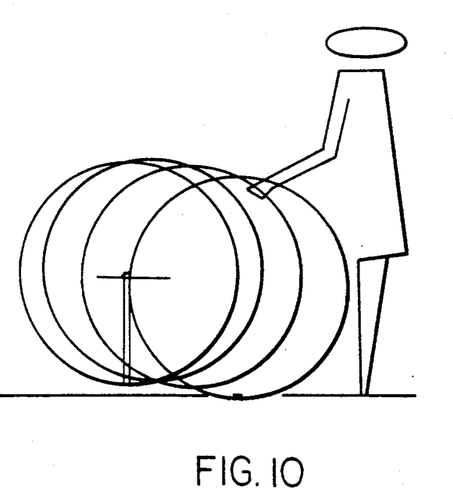
FIG. 10 is a schematic elevational view of a film handling assembly of the present invention in a shipping and handling unit loading configuration.
Figure 11:
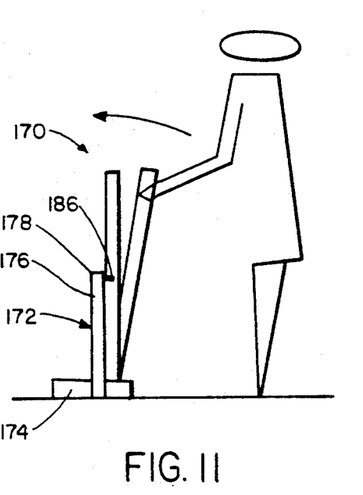
FIG. 11 is a schematic elevational view of a film handling assembly of the present invention in a shipping and handling unit mounting configuration.
Figure 12:
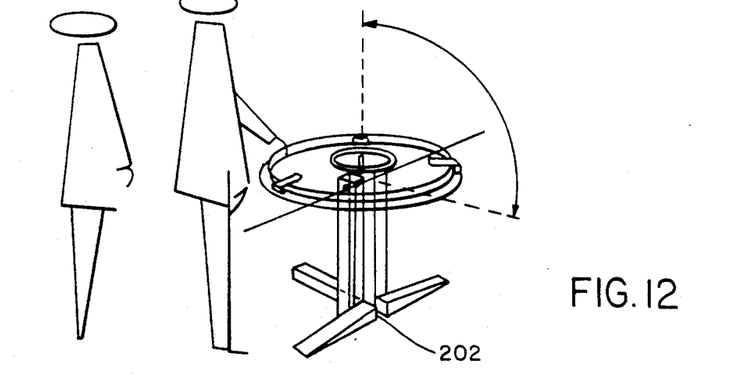
FIG. 12 is a schematic elevational view of a film handling assembly of the present invention in a shipping and handling unit re-orientating and elevating configuration.

Referring next to FIGS. 10-13, a handling assembly 170 that is used either as a work table for the film shipping and handling unit or as a film feed spindle for transferring the film to a rewind/make-up table, directly to a platter tier, or directly to a projector. The assembly includes an L-shaped frame 172 having a short leg 174 resting on a support surface, such as a floor or the like, adjacent to the platter system, and a long leg 176 connected at a bottom end thereof to the short leg and extending upwardly therefrom to a top end 178. The long leg is U-shaped in cross sectional shape and has two parallel sides 180 and 182. A pivot pin 184 spans the two sides 180 and 182 near the top end of the long leg, and the long leg has an axis extending between the two ends thereof. A spindle-engaging element 186 is pivotally mounted on the pivot pin to move between a first orientation extending transversely of the long leg axis as shown in FIG. 11 and a second orientation extending axially of the long leg as shown in FIG. 12. The spindle-engaging element 186 is sized to be rotatably received in the spindle central shaft opening 136 of the hub 132 to secure the film shipping and handling unit 14 to the assembly 170.

The assembly further includes a ramp means 190 located on the support surface near the bottom end of the long leg. The ramp means includes two ramp elements 192 and 194, each having a first end 196 and a second end 198, with an inclined surface 200 connecting the first and second ends and being upwardly inclined from the first end to the second end. The ramp second ends are located adjacent to each other but are spaced apart by a distance sufficient to form a gap 202 that is large enough to support a film handling unit 14 as indicated in FIG. 10. That unit is simply rolled up one of the ramp elements until it rests on the two ramp element second ends and bridges the gap 202. In such position, the shaft opening 136 is located immediately adjacent to the spindle engaging element 186 so that element 186 can be inserted into the opening 136 to attach the unit 14 to the assembly 170.

Figure 13:
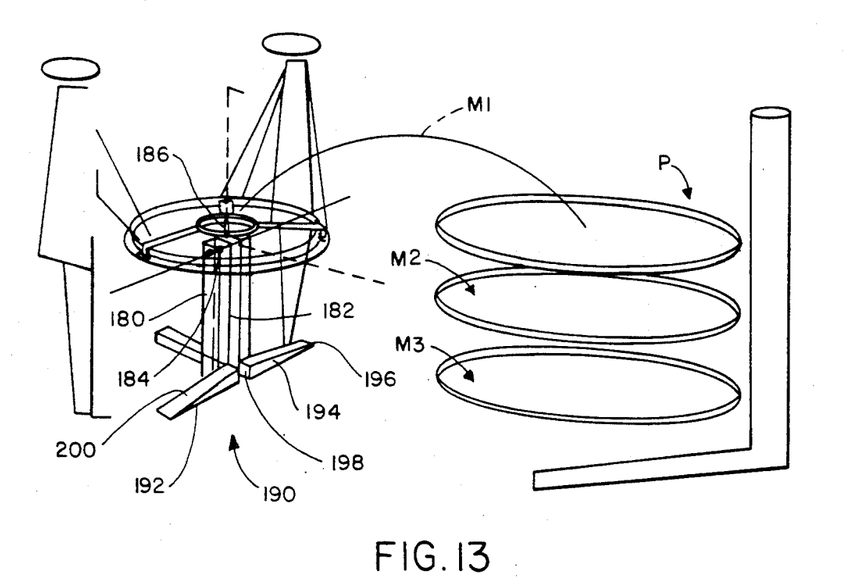
FIG. 13 is a schematic elevational view of a film handling assembly of the present invention in a shipping and handling unit supporting configuration.

Once the unit 14 is rolled onto the assembly 170, the spindle 186 is placed in the opening 136. The unit 14 is then moved from the FIG. 10 orientation into the FIG. 12 orientation. The assembly 170 is located adjacent to a platter system P, and the unit 14 can then be moved onto one of the platters of this platter system P as indicated in FIG. 13 by arrows M1-M3, when the spindle is removed.

Figure 14:
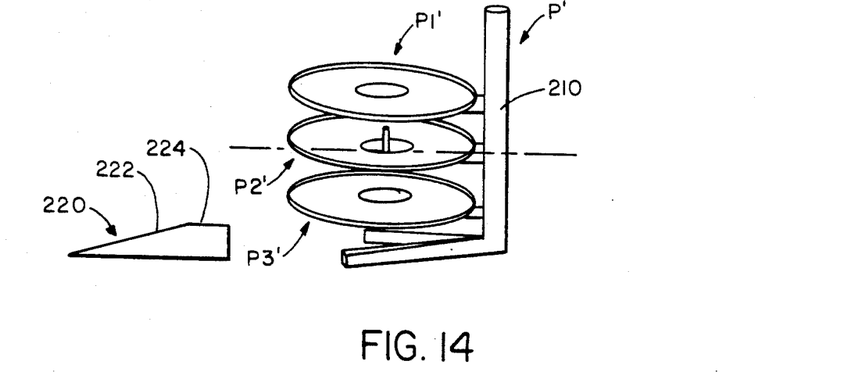
FIG. 14 illustrates an alternative form of the film handling assembly in which a platter-type projection system is modified to include a telescoping arm and a pivot mechanism on each platter.
Figure 15:
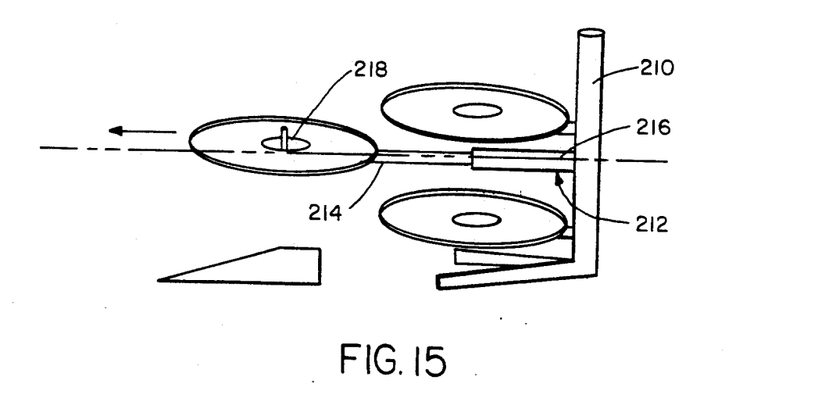
FIG. 15 illustrates the alternative form of the film handling assembly in a first position.
Figure 16:
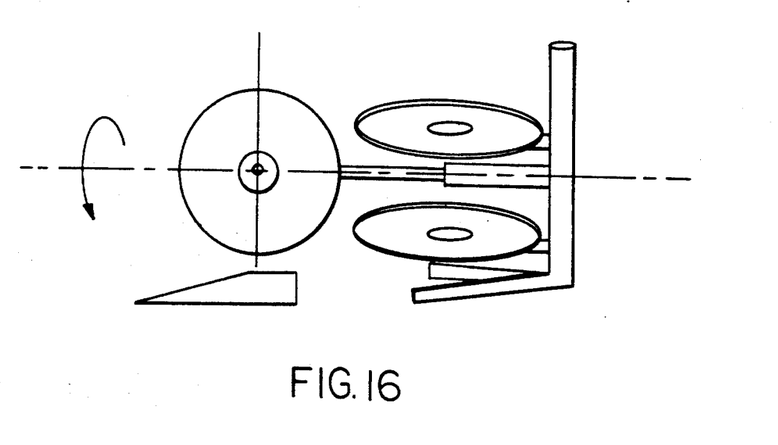
FIG. 16 illustrates the alternative form of the film handling assembly in a second position.
Figure 17:
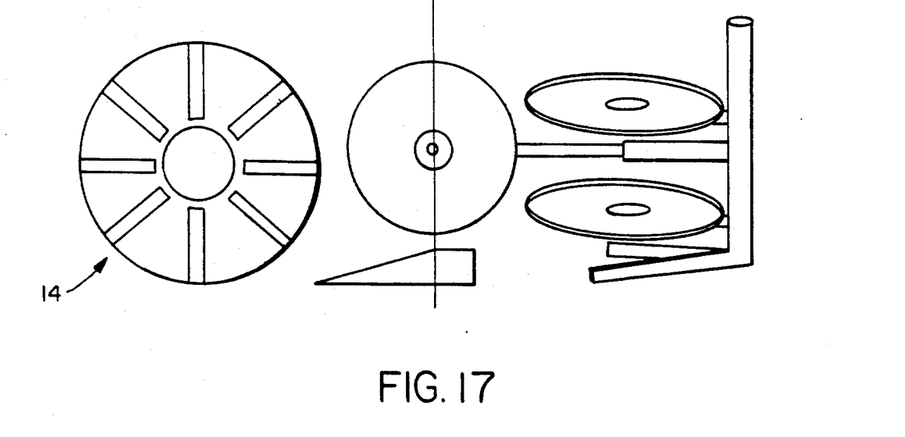
FIG. 17 illustrates the alternative form of the film handling assembly in a third position.

An alternative form of the assembly 170 is shown in FIGS. 14-21. The alternative assembly includes a modified platter system P' having three platters P1', P2' and P3' mounted on a base 210. As best shown in FIG. 15, each platter is mounted on an arm 212 that includes two telescoping sections 214 and 216, with a pivot mechanism 218 attached to the distal end of the last telescoping section. The pivot mechanism 218 is adapted to move between a first upright orientation shown in FIG. 14 to a second horizontal orientation shown in FIG. 16. The assembly 170' further includes a ramp element 220 that has an inclined surface 222 and a horizontal top surface 224. The ramp element 220 is located closely adjacent to the platter system P' as shown in the figures.

Figure 18:
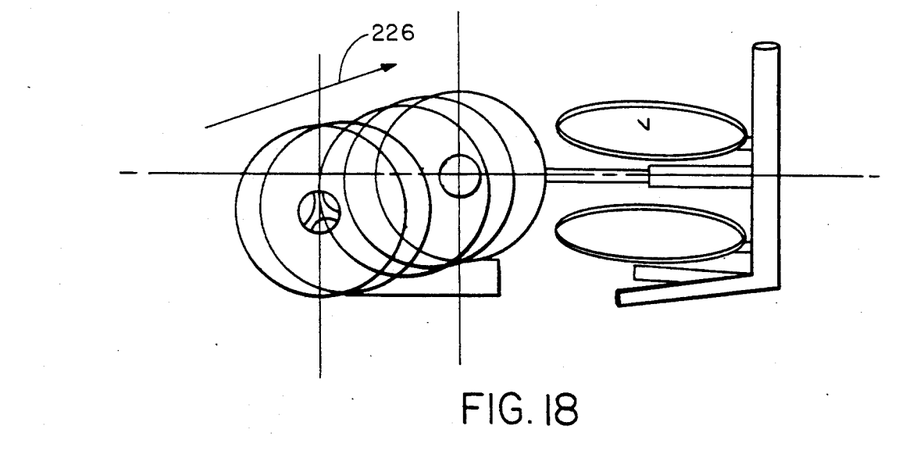
FIG. 18 illustrates the alternative form of the film handling assembly in a fourth position.
Figure 19:
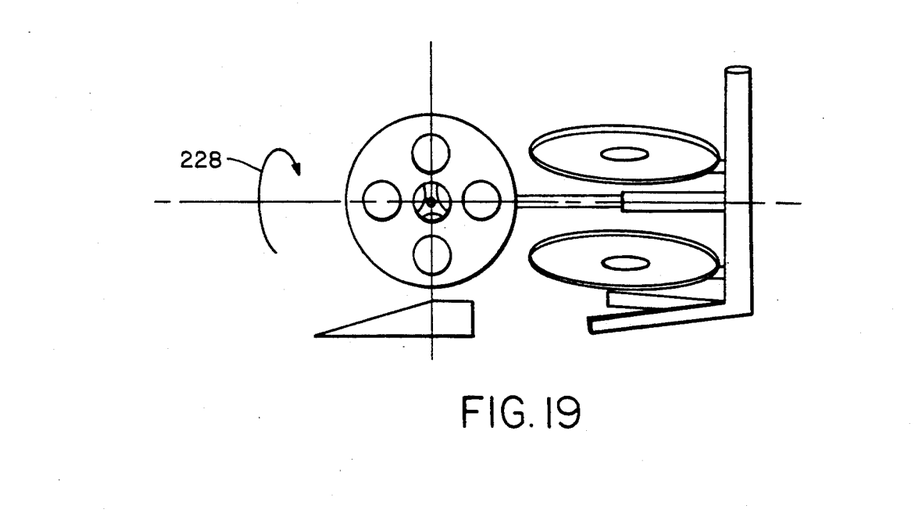
FIG. 19 illustrates the alternative form of the film handling assembly in a fifth position.
Figure 20:
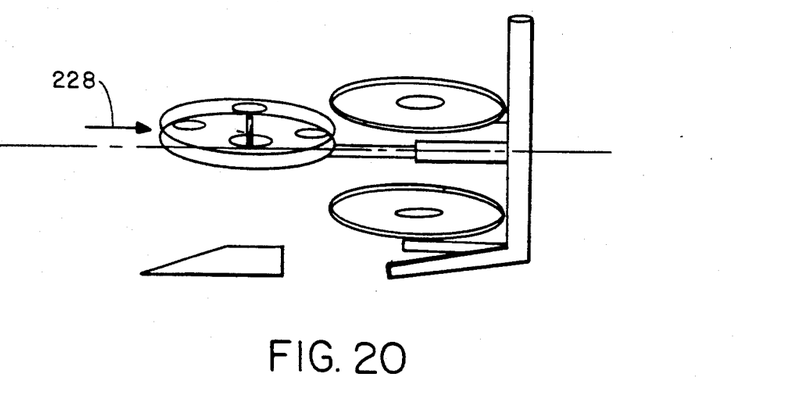
FIG. 20 illustrates the alternative form of the film handling assembly in a sixth position.
Figure 21:
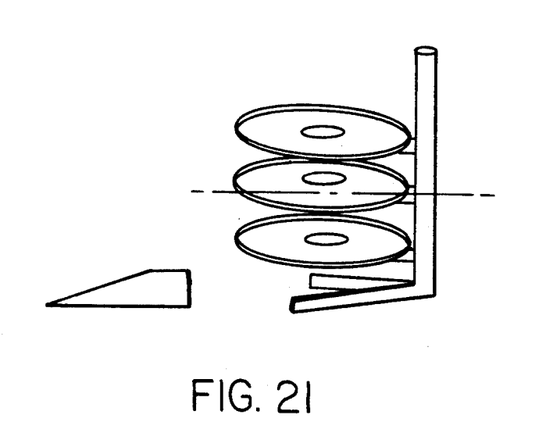
FIG. 21 illustrates the alternative form of the film handling assembly in a ready position.

As shown in FIGS. 14-21, a film strip is attached to the platter system P' by sliding one of the platters out from the FIG. 14 position to the FIG. 15 position. The platter is then rotated about the pivot mechanism from the FIG. 15 position to the FIG. 16 position. A unit 14 is then rolled up the ramp element inclined surface to a location adjacent to the tilted platter as indicated in FIG. 18 by arrow 226. One of the flanges of the unit 14 is removed, and the platter spindle is then engaged into the shaft opening 136 of the hub 130. The platter is then rotated back to the horizontal as indicated in FIG. 19 by arrow 228. The horizontally oriented platter having the unit 14 attached thereto is then moved back into the playing position as indicated by arrow 228 in FIG. 20. The play-ready film strip is shown in FIG. 21.

A further alternative form of the assembly shown in FIGS. 14-21 includes one or more telescoping arms 212 that also move angularly about the element 210 in addition to the linear telescoping movement shown in the figures. That is, the arm will also be able to move ninety degrees from the position shown in FIG. 15 to move into and out of the plane of the paper. This further facilitates mounting a film strip to a platter.

It is understood that while certain forms of the present invention have been illustrated and described herein, it is not to be limited to the specific forms or arrangements of parts described and shown.

We claim:

1. A motion picture film shipping and handling unit comprising:

A) two annular flanges, each flange having a central opening with an inner diameter, and an outer edge having an outer diameter;

B) an annular locking ring having an outer surface with an outer diameter greater than the flange central opening inner diameter, a top surface, a bottom surface, an inner wall connecting said top surface to said bottom surface and having an outer diameter that is slightly less than said central opening inner diameter to snugly abut an annular flange adjacent to the central opening of that annular flange when said locking ring is in place in that central opening, said locking ring inner wall extending above said locking ring top surface and below said locking ring bottom surface;

C) a film winding ring adapted to surround said locking ring and to be spaced radially apart from said locking ring;

D) a packing ring adapted to be placed between said film winding ring and said locking ring, said packing ring being formed of flexible packing material; and E) means for attaching said locking ring to at least one of said annular flanges.

2. The motion picture film shipping and handling unit defined in claim 1 further including a plurality of locking screws for orienting said locking ring and one of said annular flanges on a platter of a platter-type projection system.

3. The motion picture film shipping and handling unit defined in claim 2 wherein each locking screw includes an externally threaded body and a driver connection means on each end of said body for connecting said locking screw to a driver means for moving said locking screw into and out of said locking ring.

4. The motion picture film shipping and handling unit defined in claim 3 further including a center hub mounted on said locking ring.

5. The motion picture film shipping and handling unit defined in claim 4 wherein said locking ring inner wall has an inside surface with a plurality of keyways defined therein and said center hub has a plurality of wall engaging pads with each pad having a key thereon for engaging a keyway.

6. The motion picture film shipping and handling unit defined in claim 4 wherein said center hub includes a projection assembly spindle accommodating opening defined therethrough.

7. The motion picture film shipping and handling unit defined in claim 5 wherein said center hub further includes a plurality of drive pin accommodating openings defined therethrough adjacent to said spindle accommodating opening.

8. The motion picture film shipping and handling unit defined in claim 7 wherein said film winding ring includes two ends, and a size adjusting means for adjusting the diameter of said film winding ring, said size adjusting means including a tab thereon adjacent to one end and a slot defined therethrough adjacent to another end.

9. The motion picture film shipping and handling unit defined in claim 8 wherein said packing ring is divided into a plurality of separate annular sections, each section having an inner diameter and an outer diameter, with an outer diameter of one section being equal to an inside diameter of an adjacent section.

10. The motion picture film shipping and handling unit defined in claim 9 further including fastening means for attaching one annular flange and the other annular flange to said locking ring.

11. The motion picture film shipping and handling unit defined in claim 10 further including fastening means for attaching said locking assembly and said shipping container to said annular flanges.

12. The motion picture film shipping and handling unit defined in claim 11 wherein each packing ring section has a thickness dimension measured between its inner diameter and its outer diameter, and said packing ring sections include a plurality of thickness dimensions.

13. The motion picture film shipping and handling unit defined in claim 12 wherein said flexible packing material includes closed cells that can be collapsed to vary the thickness of a packing ring section.

14. The motion picture film shipping and handling unit defined in claim 13 wherein at least one packing ring section includes two ends.

15. The motion picture film shipping and handling unit defined in claim 13 wherein said packing ring is formed of polyethylene foam material.

* * * * *